Patented Mar. 11, 1952

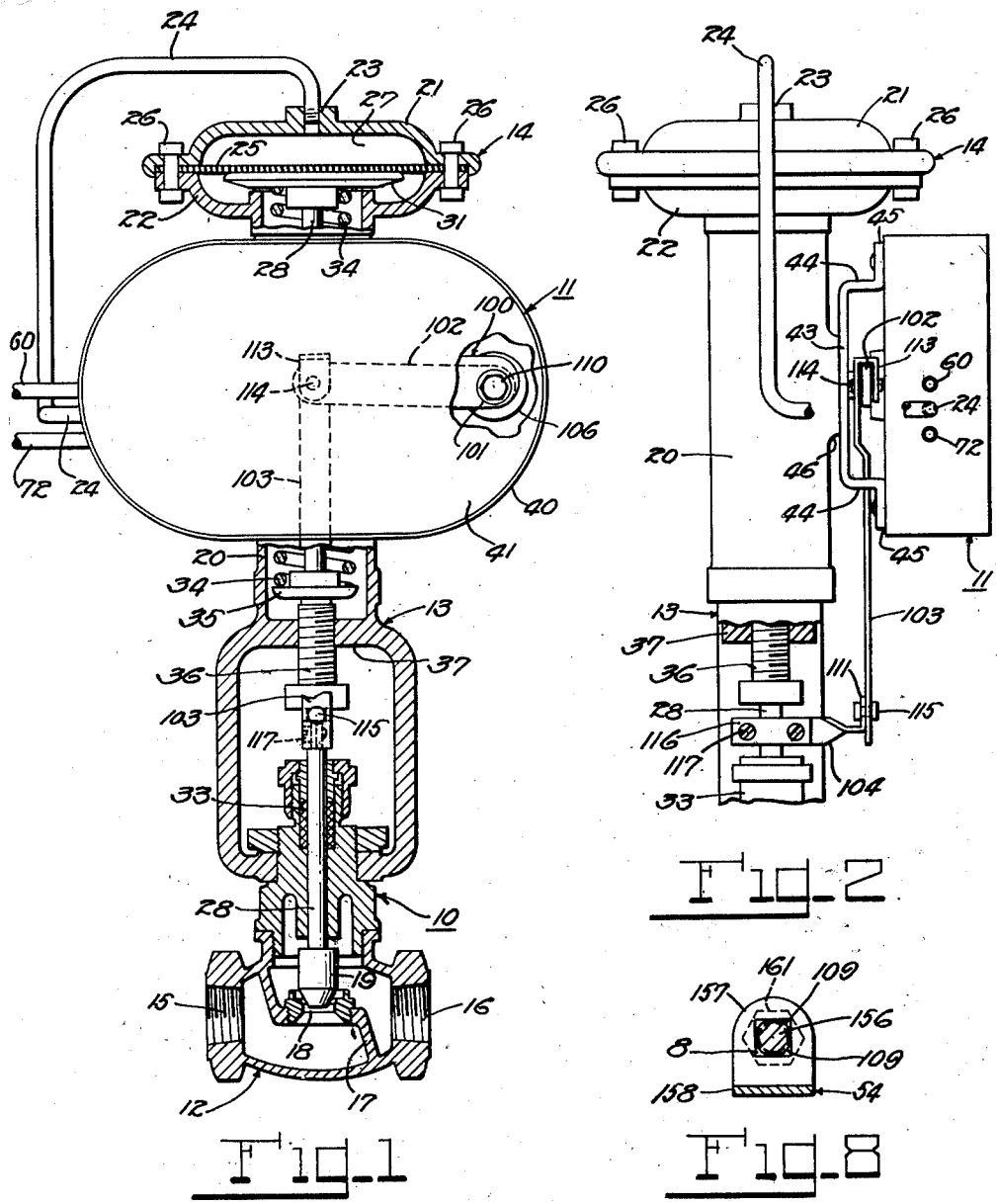

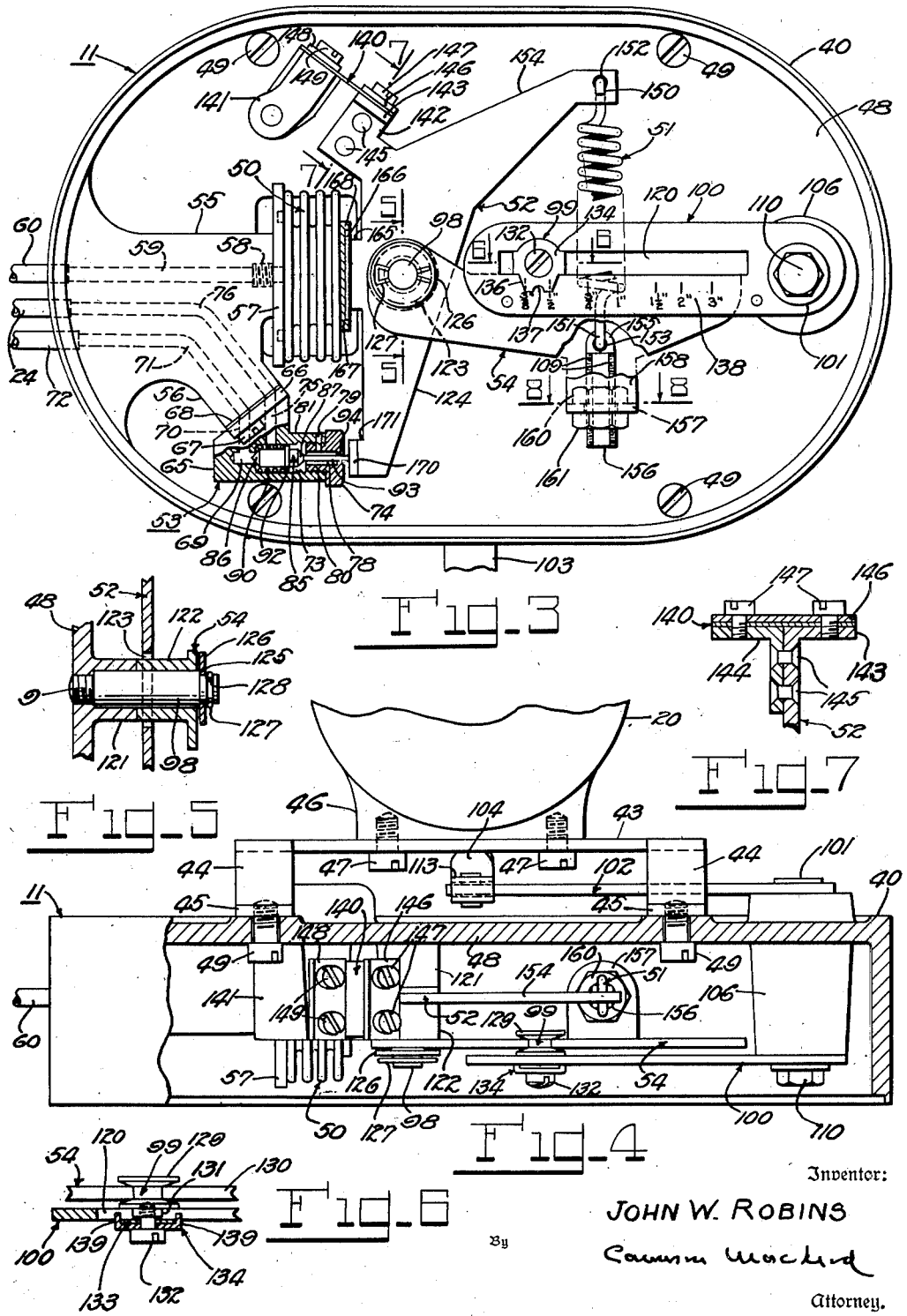

2,588,988

UNITED STATES PATENT OFFICE 2,588,988

FOLLOW-UP TYPE SERVOMOTOR

John W. Robins, Westwood, Mass., assignor to Mason-Neilan Regulator Company, Boston, Mass., a voluntary association of Massachusetts Application February 14, 1947, Serial No. 728,644

2 Claims. (Cl. 121—41)

This invention relates to positioners for use in connection with valves or other devices wherein a diaphragm or equivalent means is operated by a compressible fluid to actuate a member, such as a valve plug or the like, throughout a selected range of movement in response to variations in fluid pressure over a given range of pressure change.

Positioners to which this invention relates are commonly used in connection with diaphragm operated valves to establish a valve lift which is substantially directly proportional to the value of a controlling fluid pressure as governed by an instrument, which in turn is responsive to changes in the value of a condition under control. As is well known to those skilled in the art, valves which are operated by a compressible fluid, such as air, can not always be depended upon to respond with a high degree of accuracy to changes in the operating pressure owing to various factors, among which are friction associated with the operating parts of the control valve, off-balance pressure on the valve plug, hysteresis of the diaphragm and spring, and changes in the effective area of the diaphragm within its operating range. It therefore becomes desirable to provide means, unaffected by the factors referred to above, for positioning the valve plug substantially at the precise lift called for by the controlling pressure.

Positioners to which this invention relates operate on the force-balance principle, and in accordance with this principle of operation, a change of fluid pressure delivered by an instrument develops a change of force in a bellows or its equivalent and thereby actuates a pilot valve, whereby a change in operating fluid pressure on the control valve diaphragm occurs. The force exerted by the bellows is resisted by a spring and the change in valve lift, effected by the fluid pressure change on the diaphragm, deflects the spring until the force exerted by the spring balances the force exerted by the bellows. In as much as the pilot valve is capable of varying the diaphragm operating pressure throughout its range, the valve plug will be forced to assume the correct lift regardless of such factors as friction and hysteresis referred to above. Thus the change in valve lift is necessarily directly proportional to the change in initial pressure.

The accuracy of a positioner which functions on the force-balance principle is dependent upon the accuracy with which opposed forces come to balance. It will be evident that if in the operation of the positioner mechanism, an outside factor, such as friction, enters into the force-balance, a corresponding error will be introduced. Thus for precision balancing, the mechanical means by which the parts are made to balance, must be virtually free from friction, and since the deflection of the spring is always proportional to the valve lift, the error introduced by friction involves only the mechanical means utilized to convert the spring deflection into a proportional force and to bring that force accurately to balance against the force exerted by the bellows.

Heretofore, so far as known to me, the means utilized to convert the spring deflection into a proportional force and to bring that force to balance with the force exerted by the bellows, has been such that a friction factor has been introduced into the force-balance. So far as known to me, the spring force has been developed by means of a compression spring which is directly opposed to a bellows and deflected by a spring engaging member which is in turn actuated by the valve stem. It is understood that the ends of a helical spring tend to rotate as the spring deflects, and unless rotation is prevented, which has been found to be impracticable in the case of a helical compression spring, the rotation of the spring is altered by frictional forces at its ends. In practice, friction results in an intermittent spring rotation, each rotating movement occurring when the accumulated rotational force of the spring is sufficient to overcome the friction. It will be understood further that the axial force developed by a helical spring is altered when its ends are constrained from normal rotation and a different spring rate results. Thus the axial force exerted by the helical spring at a given deflection varies according to the amount of frictional constraint, and since the axial force developed by the spring must balance the force exerted by the bellows, the valve lift varies from the true position.

It is an object of this invention to provide a positioner which functions on the force-balance principle wherein the source of friction in the force balancing means and the error introduced thereby is virtually eliminated.

This and other objects and features of this invention will be more fully understood from the following description when taken in connection with the accompanying drawings, in which:

Fig. 1 is a front elevation of a fluid-operated diaphragm control valve provided with a positioner embodying my invention, portions of the vanve being shown in section;

Fig. 2 is a side elevation as viewed from the left of Fig. 1;

Fig. 3 is an enlarged front elevation of the positioner with the cover removed;

Fig. 4 is a top plan view, partly in section, of the positioner shown in Fig. 3; and Figs. 5, 6, 7, and 8 are sections taken, respectively, on the lines 5—5, 6—6, 7—7, and 8—8 of Fig. 3.

Having reference to the drawings, there is illustrated in Fig. 1 a fluid operated diaphragm control valve 10 which may be of any usual construction and is provided with a positioner 11 embodying my invention. The valve comprises a body 12, an intermediate 13 to which the body is attached, and a diaphragm casing 14 which is mounted on the intermediate and may be secured thereto in any well-known manner. The valve body includes the usual inlet and outlet connections 15 and 16, a partition 17 defining a control orifice 18, and a valve member 19 which cooperates with the control orifice for varying fluid flow through the valve. The valve member 19 may be suitably characterized as required, and as herein illustrated, is of the single seated type and is therefore subjected to off balance pressure over at least a portion of its operating range. The intermediate 13 may include a spring barrel 20 on which the positioner 11 is mounted in a manner to be described, and the upper end of the intermediate supports the diaphragm casing 14 to which the spring barrel portion is fixedly secured. The diaphragm casing comprises upper and lower dished members 21 and 21, respectively, the former being provided with a fluid pressure connection 23 into which a pipe 24 leading to the positioner 11 is threaded.

Means for operating the valve member 19 is in the form of a diaphragm 25 which is clamped at its periphery between suitable flanges on members 21 and 22 as by bolts 26. The diaphragm 25 and member 21 define a fluid pressure chamber 27 which is subjected to changes in operating pressure as governed by the positioner 11 in a manner to be described. A stem 28 serves to connect the diaphragm 25 with the valve member 19. The stem may be connected at its upper end to a diaphragm button 31 and at its lower end may likewise be connected to the valve member 19 whereby the position of the diaphragm, within its operating range, determines the lift of the valve member. The stem 28 extends through a stuffing box 33 in the upper portion of the valve body 12 and is surrounded by a helical spring 34 which is retained between a spring button 35 and the diaphragm button 31 in the usual manner, the spring button being supported on an adjustment member 36 which surrounds the valve stem and is threaded into a cross member 37 of the intermediate to provide the diaphragm range desired. It will be understood that on an increase of pressure in the diaphragm chamber 27, the spring 34 is compressed and the valve member 19 is moved toward closed position, and that on a decrease of pressure, the opposite occurs.

The control valve 10 may be used for varying fluid flow to effect changes in the value of a condition such as temperature, pressure, liquid level and the like, to which an instrument, not shown, of any well-known construction, is responsive and is capable of varying a controlling fluid pressure on a basis which is proportional to changes in the value of the condition. As will hereinafter be pointed out, the positioner 11 functions to vary the lift of the valve member 19 in substantial proportionality with changes in the controlling pressure and positions the valve member at substantially the precise position called for by the instrument, unaffected by such factors as friction, hysteresis of the valve spring 34, changes in effective area of the diaphragm 25, off-balance pressure on the valve member 19, and the like.

The positioner 11 includes a housing 40 and a cover 41 detachably connected thereto in any well known manner. Means for mounting the positioner on the spring barrel 20 of the intermediate consists of a bracket in the form of a plate 43 (see Fig. 4) having forwardly projecting legs 44 each of which is provided with an out-turned flange 45. The plate 43 is adapted to fit against a suitable boss 46 on the spring barrel and to be secured thereto by screws 47, and the flanges 45 engage the rear surface of a back plate 48, forming a part of the housing, to which they are connected by screws 49.

As referred to above, the positioner functions on the force-balance principle and the parts directly associated with the force-balance comprise a bellows 50, a spring 51, means including an angle lever 52 which functions to bring the force exerted by the spring to bear against that generated in the bellows, a pilot valve 53 actuated by the angle lever and an arm 54 for deflecting the spring. Movement of the arm 54 results in a deflection of the spring 51 on a basis which is proportional to the valve lift in a manner to be described.

The bellows 50 and pilot valve 53 are mounted, respectively, on suitable bosses 55 and 56 which are preferably integral with the housing 40. The bellows 50 is provided with a base 57 having an extension 58 which is threaded into the inner end of a through port 59 in the boss 55, the outer end of the port being connected with a pipe 60 which in turn connects with a controlling pressure, as may be supplied by an instrument. The pilot valve 53 includes a body 65 having a flange 66 which is mounted on a correspondingly shaped end of the boss 56 and is in pressure tight connection therewith by means of screws 67 and a gasket 68. The pilot valve body 65 has an inlet chamber 69 which connects at one side with an inlet passage 70, communicating in turn with the inner end of a through port 71 in the boss 56, the outer end of said port being connected to a pipe 72 to which regulated fluid pressure may be supplied from a source not shown. The inlet chamber 69 connects with a pressure chamber 73 in the form of a bore, extending through one end of the body, into the open end of which a closure cap 74 is threaded. One side of the pressure chamber 73 communicates with the pipe 24, in connection with the control valve diaphragm chamber 27, and for this purpose the body 65 and boss 56 include passages 75 and 76, respectively, the outer end of the latter passage being connected to the pipe. The chamber 73 also communicates with an outlet passage 78 which extends partly through the closure cap 74 along the axis thereof and connects with an exhaust port 79 leading to atmosphere through an extension 80 on the cap and a wall 81 of the body. Thus the pressure chamber 73 is in fluid connection with the supply pipe 72, with the control valve diaphragm chamber 27, and with the atmosphere.

Means for varying fluid flow to and from the pressure chamber 73 of the pilot valve through the inlet and outlet passages 69 and 78, respectively, is in the form of a double-seated valve member 85. The overall length of the valve member is somewhat less than that of the pressure chamber 73. It is provided with cone-shaped ends 86 and 87 and is adapted to cooperate with suitable seats at the inner end of passages 69 and 78, respectively. A compression spring 90, retained between the end wall of the pressure chamber and a collar 92 on the valve member, serves normally to urge the valve member to a position in which the inlet passage 69 is fully open and the outlet passage 78 is closed. A stem 93, disposed axially of the outlet passage 78, in spaced relation therewith, and projecting through a guide opening 94 at the outer end of the closure cap 74, may be employed to position the valve member in respect to the inlet and outlet passages. In operation, the movement of the valve member 85 towards the inlet passage 69 simultaneously reduces the flow of inlet fluid to the chamber 73 and increases the flow of exhaust fluid therefrom, thereby decreasing the pressure in the pilot chamber and consequently the pressure in the diaphragm chamber 27. When the valve member is moved towards the exhaust passage 78, the opposite occurs, and it will be understood that for reasons hereinafter to appear the overall working range of the valve member 85 is relatively minute, in actual practice on the order of .003 inch.

As referred to above, the pilot valve member 85 is positioned by the force-balance mechanism to effect changes of fluid pressure on the control valve diaphragm 25 until the control valve member 19 arrives at the lift called for by the controlling pressure instrument. Therefore a change of force exerted by the bellows 50, resulting from a change in controlling pressure, must be offset by a change of force generated by the spring 51, resulting from a change in spring deflection. And it will be understood that the change in spring deflection must be proportional to the movement of the control valve member 19 if a valve lift which is proportional to the change in controlling pressure, is to be obtained. Thus the spring deflecting member 54, which is mounted on a fixed pivot 98, must likewise move on a basis which is proportional to the movement of the control valve member. To this end, the spring deflecting member 54 is in operative connection with the control valve stem 28 by means of a fulcrum 99 carried by an arm 100 within the casing 40, a shaft 101 to which the arm 100 is secured, an arm 102 secured to the shaft 101 which extends through the back of the casing, a link 103, and a link actuating member 104 connected with the valve stem 28. The shaft 101 is mounted in a bearing 106 which is preferably integral with the casing back plate 48. The inner arm 100 is detachably connected to the shaft 101 by means of a screw 110. The outer arm 102 is substantially in parallel with the inner arm 100 and likewise is carried by the shaft 101 to which it may be secured in any well known manner. The other end of the outer arm 102 is spanned by a U-shaped end 113 with which the link 103 is provided, the parts being pierced to receive a pivot pin 114. The link actuating member 104 has an upturned end 111 (Fig. 2) pivotally connected at 115 with the link, the other end being shaped to engage a portion of the cylindrical wall of the stem 28 against which it may be adjustably clamped by a plate 116 having screws 117 for securing the parts together. By this means, the rotative position of the inner arm 100 is varied on a basis which is proportional to a change in lift of the control valve member 19.

It will be understood that the overall movement of the pilot valve member 85 is fixed and that therefore the rotative movement of the angle lever 52, to be more fully described, is likewise fixed; and it is also understood that the capacity of the bellows 50 and the characteristics of the spring 51, also to be more fully described, remain fixed. Therefore, since the positioner is adapted for use in connection with control valves of various sizes, each of which may have a different lift, an adjustable linkage is required for adapting the positioner to varying overall valve strokes. The positioner embodying my invention is herein shown, for purposes of illustration, for use in connection with valves having strokes from 3/8" to 3", inclusive. The spring deflecting arm 54 engages the fulcrum 99 which is adjustably mounted in a slot 120 in the inner arm 100. The pin 98 on which the spring actuating arm 54 is mounted extends into a boss 121 (Fig. 5) of the back plate 48 and is threaded into the plate as indicated at 9. The pin makes a sliding fit with a cylindrical portion 122, secured to the arm 54 through which the pin extends, the cylindrical portion being arranged to project through an opening 123 in a leg 124 of the angle lever 52 and being in spaced relation with the wall of the opening for reasons hereinafter to be pointed out. At its outer end, the pin 98 is reduced to provide a shoulder 125, a washer 126 being received over the reduced end and retained against the shoulder by means of a clip 127 which cooperates with a suitable annular groove 128 at the end of the pin. The fulcrum 99 consists of a spool 129 (Fig. 6) which engages and spans the upper surface 130 of the spring deflecting arm 54. Secured to the spool is a slot engaging member 131 which extends partially through the slot 120 and is adapted to making a sliding fit therewith. The outer end of the member 131 is threaded to receive a screw 132 which is surrounded by a washer 133 and an index member 134 whereby the fulcrum 99 may be clamped at any desired position along the slot. By means of the washer 133, the index 134 is spaced from the side of the arm 100 and is provided with a depending portion 136 (Fig. 3) having an index groove 137 which is adapted to cooperate with suitable indicia 138 spaced at selected intervals along the side of the slot 120. Means for preventing the index plate 134 from turning when the clamping screw 132 is turned to secure the fulcrum 99 at selected positions along the arm 100, is in the form of inturned ears 139 (Fig. 6) which engage the slot 120 and make a sliding fit therewith. Thus while the degree of rotation of the inner arm 100 varies with the overall stroke of the control valve, the degree of overall rotation of the spring deflecting arm 54 may remain constant for different sized valves having various valve lifts. It will be understood that by setting the fulcrum at a selected indicia 138, the positioner may be adjusted for a valve having a corresponding stroke.

While friction entering into the operation of the linkage just described has no effect on the accuracy with which the positioner functions since the pressure is varied on the control valve diaphragm until the valve member 19 assumes the correct lift, friction entering into the operation of the parts directly connected with force balance has a substantial effect on the results obtained, as pointed out above. I have found that friction associated with the functioning of the parts just referred to will vary the valve lift from that called for by the instrument controlling pressure by an amount which is dependent on the value of the friction factor. And in order to eliminate friction from the operation of these parts, the force balance mechanism herein disclosed is employed.

The force balance mechanism is arranged so that the spring 51 is in tension and is constrained against rotation, and the angle lever 52 is mounted on a frictionless pivot 140 in the form of a spring leaf flexure, thereby maintaining a uniform spring rate throughout the spring operating range and transmitting the force of the spring against that of the bellows without intervening friction such as is inherent in the usual bearing type of pivot. And in combination with the angle lever 52, I employ a pilot valve, such as the pilot valve 53, having a relatively minute overall range of movement, whereby the angle of rotation of the lever is infinitesimal and is well within the working range of a spring flexure type of pivot, it being understood that the operating range of a spring leaf flexure is extremely limited and that if it exceeds this range, distortion occurs resulting in inaccuracies in pivotal movement and even in breakage. The spring leaf flexure 140 which may comprise a flat strip of flexible material, is secured at one end to the angle lever 52 and at the other end to a post 141 which is preferably integral with the casing back plate 48. As herein shown, the angle lever is in the form of a sheet metal stamping having an extension 142 at the angle thereof. One side of the extension 142 is bent forwardly, as viewed in Fig. 3, to form one half of a transverse flange 143 (see Fig. 7) on which the flexure 140 rests, the other half of the flange being provided by an angle member 144 which is riveted at 145 to one side of the extension. A plate 146 serves to secure the leaf spring 140 to the flange 143, the parts being pierced with suitable holes to receive screws 147 which are threaded into the flange. The other end of the leaf spring is secured to the post 141 in a similar manner, namely, by a plate 148 and screws 149 as shown in Fig. 3.

The spring 51 is provided with hook-shaped ends 150 and 151 which are received, respectively, in circular openings 152 and 153 the former being disposed in the end of a leg 154 of the angle lever 52 and the latter in a flattened end 155 of an adjustment screw 156 which is mounted on the arm 54. The adjustment screw 156 is substantially square in cross section (see Fig. 8) and has a loose fit in a square opening 8 in a laterally extending flange 157 on the lower end of an extension 158 which depends from the arm 54 substantially midway between the ends thereof. The screw 156 is threaded at the corners as indicated at 109. Means for adjusting the screw 156 to vary the initial tension on the spring 51 and for locking the parts in adjusted position, may be in the form of an adjusting nut 160 and a lock nut 161. Since the spring 51 is under tension, the hook-shaped ends 150 and 151 are bottomed in holes 152 and 153, respectively, and the spring is prevented from rotating as deflection occurs, whereby the rate of a constrained spring is maintained throughout its operating range and a uniform spring rate results.

To provide the angle lever 52 with means for engaging the bellows 50 and to combine therewith means for guiding the lever in its plane of rotation and to render it stable in operation, I provide the leg 124 of this lever, at a point intermediate its ends, with an extension 165 having a transversely disposed circular plate 166 secured at the end thereof. The free end of the bellows 50 is sealed by a rigid disc-shaped member 167 having a central recess, formed by an external flange 168, into which the lever plate 166 is received and makes a snug fit therewith. Thus the force of the spring 51 is brought to bear directly against the free end of the bellows 50 and the bellows assists the leaf spring 140 in restricting the angular movement of the lever to its selected plane of rotation.

The outer end of the angle lever leg 124 is in operative engagement with the stem 93 of the pilot valve and for this purpose has a laterally disposed stem engaging flange 170 which is preferably integral with an extension 171 provided on the leg. Since the leverage arm of the stem engaging portion 170 is substantially twice the length of the leverage arm of the bellows engaging plate 166, the pilot valve is exceedingly sensitive to small changes of controlling pressure in the bellows 50. As a safety factor, to prevent the spring leaf flexure 140 from becoming distorted by deflection beyond its elastic limits, I mount the pivot pin 98 of the arm 54 in the opening 123 in the angle lever leg 124, as referred to above; the cylindrical portion 122 of the spring deflecting arm 54 being spaced from the wall of the opening to permit the lever to have sufficient movement to provide the overall travel required for the pilot valve member 85 but to limit the counter-clockwise rotation of the lever at a point which is well within the working range of the spring leaf flexure. Excessive movement in the opposite direction under the influence of the spring 51 is prevented by the engagement of the stem operating flange 170 with the pilot valve cap 74. The aforesaid construction also serves to prevent the spring leaf flexure from becoming damaged during assembly and shipment. By reason of the mechanical advantage referred to and the relatively small movement required to actuate the pilot valve member throughout its operating range, the angle of rotation of the lever is so small as to be negligible.

I regard the construction just described as an important feature of my invention. By reason of the almost negligible movement of the angle lever the use of the leaf spring 140 is not only made possible but the force exerted by the bellows 50 and the force developed by the spring 51 produces a resultant force which remains substantially along the diagonal of a force parallelogram. And since the force of the bellows and that of the spring remain proportional at all times, the direction of the resultant force remains fixed changing only in magnitude. And since the spring flexure 140 is mounted on a plane which is coincident with the resultant force, the spring flexure is subjetced to tension only and an accurate force-balance, unaffected by friction or other error introducing factor, is provided.

In operation, assuming that the control valve is employed in connection with an instrument to vary fluid flow affecting the value of a condition to which the instrument is responsive, when the value of the condition increases, the controlling pressure is increased by the instrument in proportion thereto and the increase in pressure is communicated to the bellows 50 through the pipe 60 and the port 59. The bellows thereupon expands and turns the angle lever 52 counter-clockwise to permit the pilot valve member 85 to move towards the exhaust port 70 and away from the inlet port 69 by a corresponding amount. The resulting increase of pressure in the pilot chamber is communicated, through the passages 75 and 76 and the pipe 24, to the casing chamber 27 and the diaphragm 25 moves the control valve member 19 towards its seat. As the valve stem 28 moves down, the link actuating member 104 and link 103 move with it thereby rotating the outer positioner arm 102, shaft 101 and inner arm 100 counter-clockwise (Fig. 3). The spring deflecting arm 54 is turned clockwise by the fulcrum 99 on a proportional basis and the spring 51 is extended until the increase in force comes to balance with the additional force generated in the bellows 50 as a result of the rise of controlling pressure. The angle lever 52 is thus turned clockwise to its normal force-balance position and the pilot valve member 85 is returned to neutral thereby arresting the movement of the control valve stem 28 when the valve member 19 is positioned substantially at the precise lift demanded by the controlling pressure. On a decrease of controlling pressure the opposite occurs.

Having herein described my invention, what I claim and desire to secure by Letters Patent, is:

1. In a positioning device for a regulating means having a fluid pressure motor and a control member actuated thereby, the combination of a pressure responsive element for connection with a controlling pressure, an arm actuated by said motor and movable proportionally therewith, a tension spring connected at one end with said arm, a lever to which the other end of said tension spring is connected, means operatively connecting said element with said lever, a support, a spring leaf flexure rigidly connected to said support and rigidly connected to said lever at a point between said spring connection and said element connection, said spring leaf flexure having its longitudinal axis substantially in coincidence with the line of resultant force exerted by said element and said tension spring, and a pilot valve in operative connection with said lever and having a passage for communication with a source of fluid pressure for varying fluid pressure from said source to said motor.

2. In a positioning device for a regulating means having a fluid pressure motor and a control member actuated thereby, the combination of a bellows having an end wall exerting a force proportional with a controlling pressure with which the said bellows is adapted to be connected, an arm actuated by said motor and movable proportionally therewith, a tension spring connected at one end to said arm, an angle lever having a leg to which the other end of said tension spring is connected and a leg with which the end wall of said bellows is in engagement, a spring leaf flexure on which said lever is suspended having a rigid connection with said angle lever substantially at the vertex thereof and having a relatively limited working range of flex affording to said angle lever a correspondingly limited range of movement, the longitudinal axis of said flexure being substantially in coincidence with the line of resultant force exerted by said bellows and said tension spring, and a pilot valve in operative connection with a leg of said angle lever, said pilot valve having a passage for communication with a source of fluid pressure for varying fluid pressure from said source to said motor and having a relatively minute working range of movement which is less than the limited range of movement of said lever, whereby the direction of the resultant force is substantially fixed, said force changing only in magnitude.

JOHN W. ROBINS.

REFERENCES CITED

The following references are of record in the file of this patent:

UNITED STATES PATENTS

| Number | Name | Date |
|---|---|---|
| 1,261,090 | Zisterer | Apr. 2, 1918 |
| 2,107,976 | Blasig | Feb. 8, 1938 |
| 2,264,262 | Erbguth | Nov. 25, 1941 |
| 2,298,112 | Edwards | Oct. 6, 1942 |
| 2,382,941 | Moore | Aug. 14, 1945 |
| 2,408,685 | Rosenberger | Oct. 1, 1946 |